United States Patent
Payne et al.

(10) Patent No.: US 6,795,548 B2
(45) Date of Patent: Sep. 21, 2004

(54) METHOD AND SYSTEM FOR DATA COMMUNICATION

(75) Inventors: Ralph E. Payne, Dallas, TX (US); Michael O. Polley, Richardson, TX (US); Fred J. Reuter, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 615 days.

(21) Appl. No.: 09/754,746

(22) Filed: Jan. 4, 2001

(65) Prior Publication Data

US 2001/0031048 A1 Oct. 18, 2001

Related U.S. Application Data

(60) Provisional application No. 60/174,622, filed on Jan. 5, 2000.

(51) Int. Cl.$^7$ .............................................. H04M 1/00
(52) U.S. Cl. .............................. 379/399.01; 379/390.04
(58) Field of Search ........................... 379/399.01, 402, 379/412; 375/219, 222; 330/282, 86

(56) References Cited

U.S. PATENT DOCUMENTS 6,424,221 B1 * 7/2002 Korn .......................... 330/282

* cited by examiner

Primary Examiner—Minsun Oh Harvey
Assistant Examiner—Jefferey Harold
(74) Attorney, Agent, or Firm—April M. Mosby; Wade James Brady, III; Frederick J. Telecky, Jr.

(57) ABSTRACT

A system for data communication is disclosed that comprises a hybrid circuit (220) that receives a signal. A switched gain circuit (204) coupled to the hybrid circuit (220) receives the signal from the hybrid circuit (220). A receiver circuit (206) coupled to the switched gain circuit (204) receives the signal from the switched gain circuit (204). The switched gain circuit (204) adjusts the power of the signal transmitted to the receiver circuit (206). More specifically, the switched gain circuit (204) detects the power of the signal received from the hybrid circuit (220), and adjusts the power of the signal transmitted to the receiver circuit (206) based upon the power of the signal received from the hybrid circuit (220). A method for data communication is disclosed. A signal is received using a hybrid circuit (220). The signal is transmitted to a switched gain circuit (204) coupled to the hybrid circuit (220). The power of the signal is adjusted using the switched gain circuit (204). The adjusted signal is transmitted to a receiver circuit (206) coupled to the switched gain circuit (204). More specifically, the power of the signal is detected, and the power of the signal transmitted to the receiver circuit (206) is adjusted based upon the power of the signal received from the hybrid circuit (220).

16 Claims, 2 Drawing Sheets

METHOD AND SYSTEM FOR DATA COMMUNICATION

This application claims priority under 35 USC §119(e)(1) of provisional application Ser. No. 60/174,622 filed Jan. 05, 2000.

TECHNICAL FIELD OF THE INVENTION

This invention relates generally to the field of data processing and more specifically to a method and system for data communications.

BACKGROUND OF THE INVENTION

The rising use of asymmetric digital subscriber lines (ADSL) has led to the need for improved ADSL transceiver units. The high data rates required to properly support emerging multimedia Internet applications far exceed the capabilities of conventional voice band transceiver units. For example, seamless, real-time delivery of digital video clips might require connections up to 100 times faster than is currently available with voice band transceiver units. ADSL transceiver units (ATUs) provide residential Internet users with a much-needed solution to this shortage of remote access bandwidth, while taking advantage of the enormous installed base of copper twisted-pair telephone wire that exists between the telephone company central offices (COs) and local residential customers. ATUs connected directly to the Internet are installed in the telephone company central office, allowing remote access over the copper twisted-pair telephone lines by a remote ATU (ATU-R) in the home of a residential customer. The Internet data does not pass through the telephone switching network, and as a result the ADSL link can provide data communication rates in the Mbit/sec range.

An ATU and a plain old telephone service (POTS) telephone (or other voice band equipment) can in principle operate simultaneously over the same copper loop, since they use different frequency bands. The connection of a telephone to the same wires as an ATU, however, presents several problems that result from the fact that the telephone is not designed to handle high frequencies (above 3.5 kHz). Since these frequencies are beyond the voice band, telephones do not behave well in the presence of high power signals in frequency ranges above voice band. The telephone often contains nonlinear components, such as Zener diodes, transistors, varistors, triacs, and other devices used for over-voltage protection, side tone generation, and over-volume protection. When a telephone goes off-hook while transmission is in progress, these components produce nonlinear echoes at the harmonics of the upstream signal, the signal travelling from the remote transceiver to the central office. Some of these echoes lie in the downstream band of the ATU, thus severely corrupting the downstream signal, the signal travelling from the central office to the remote transceiver.

According to one known approach for resolving these problems, a POTS splitter is used to isolate the DSL high frequency signals from the voice band signal. Generally, a splitter is a combination of low-pass and high-pass filters. The low-pass filter is used to isolate the voice band signal and route it to and from the telephone, and the high-pass filter is used to isolate the DSL signal and route it to and from the ATU. The splitter may be part of the ATU. A problem with this approach is that the telephone has to be connected to the ATU. Alternatively, the splitter may be installed at the line drop to the home. A problem with this approach is that it requires professional installation and re-wiring of the telephone lines going to the ATU inside the customer's premises.

According to another known approach, the ATU has one operating condition when a POTS device is on-hook and another operating condition when the device is off-hook. During off-hook operation, the power of the upstream signal is reduced to avoid the nonlinear regions of the nonlinear components in the POTS device, thus reducing the nonlinear echo and the generated harmonics. As a result, the POTS telephone and the ATU may be connected directly to the same line without a splitter, thus enabling the customer to plug the ATU as well as the telephone in any phone jack in the home. There is, however, a problem with the splitterless operation of ATUs. The power cutback of the upstream signal causes the central office ATU (ATU-C) to estimate that the ATU-R is at a greater distance from the ATU-C than it actually is. As a result, the ATU-C boosts its downstream output power. If the ATU-R is far away, then the received power level is within the operational range of the high gain receiver amplifier, and no problems result. If, however, the ATU-R is close to the ATU-C, then the received power level will saturate the amplifier and the connection will fail or perform poorly.

While these approaches have provided improvements over prior approaches, the challenges in the field of data processing have continued to increase with demands for more and better techniques having greater effectiveness.

SUMMARY OF THE INVENTION

In accordance with the present invention, a method and system for data communication are provided that substantially eliminate or reduce the disadvantages and problems associated with previously developed systems and methods.

According to one embodiment of the present invention, a system for data communication is disclosed that comprises a hybrid circuit that receives a signal. A switched gain circuit coupled to the hybrid circuit receives the signal from the hybrid circuit. A receiver circuit coupled to the switched gain circuit receives the signal from the switched gain circuit. The switched gain circuit adjusts the power of the signal transmitted to the receiver circuit. More specifically, the switched gain circuit detects the power of the signal received from the hybrid circuit, and adjusts the power of the signal transmitted to the receiver circuit based upon the power of the signal received from the hybrid circuit.

According to one embodiment of the present invention, a method for data communication is disclosed. A signal is received using a hybrid circuit. The signal is transmitted to a switched gain circuit coupled to the hybrid circuit. The power of the signal is adjusted using the switched gain circuit. The adjusted signal is transmitted to a receiver circuit coupled to the switched gain circuit. More specifically, the power of the signal is detected, and the power of the signal transmitted to the receiver circuit is adjusted based upon the power of the signal received from the hybrid circuit.

A technical advantage of the present invention is that it protects the receiver amplifier of an ADSL transceiver unit, which allows for power cutback of the upstream signal in order to avoid the nonlinear regions of the nonlinear components of a POTS device, thus reducing the nonlinear echo and the generated harmonics and improving signal quality. Another technical advantage of the present invention is that it allows a customer to plug the transceiver unit as well as a telephone in any phone jack on the customer's premises, without requiring professional installation and rewiring of the telephone lines inside of the premises. These technical advantages provide residential users with a much-needed solution to the shortage of remote access bandwidth, while taking advantage of the enormous installed base of copper twisted-paired telephone wire that exists between central offices and local residential customers.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
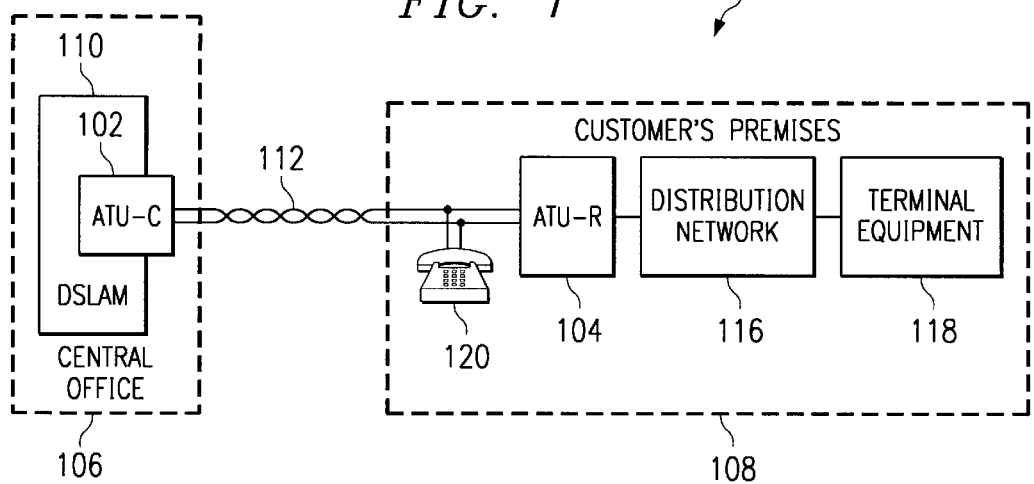
FIG. 1 is a block diagram of one embodiment of a data communication system that may be used in accordance with the present invention.
Figure 2:
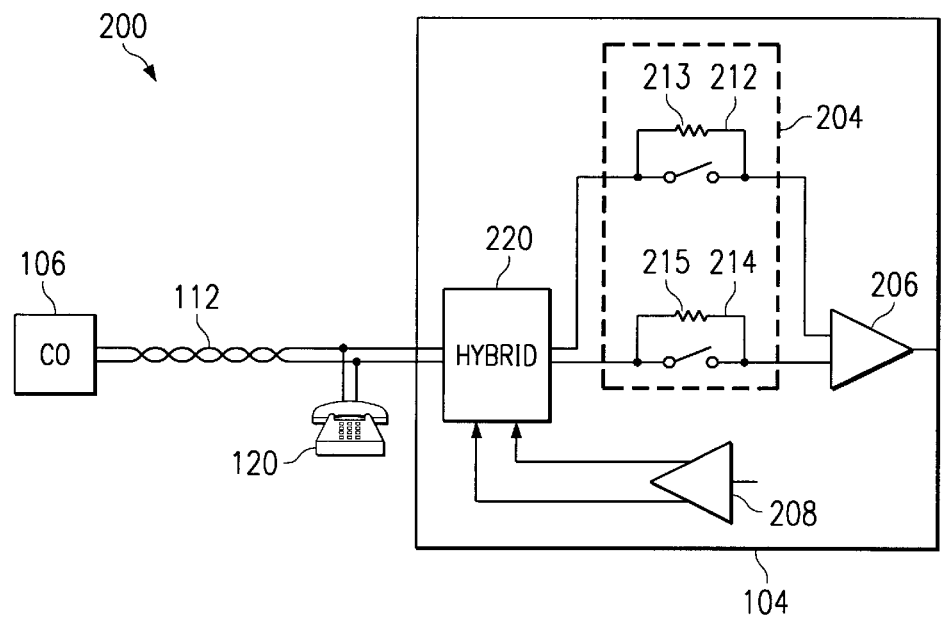
FIG. 2 is a block diagram of one embodiment of a system for adjusting the power of a signal that may be used in accordance with the present invention.
Figure 3:
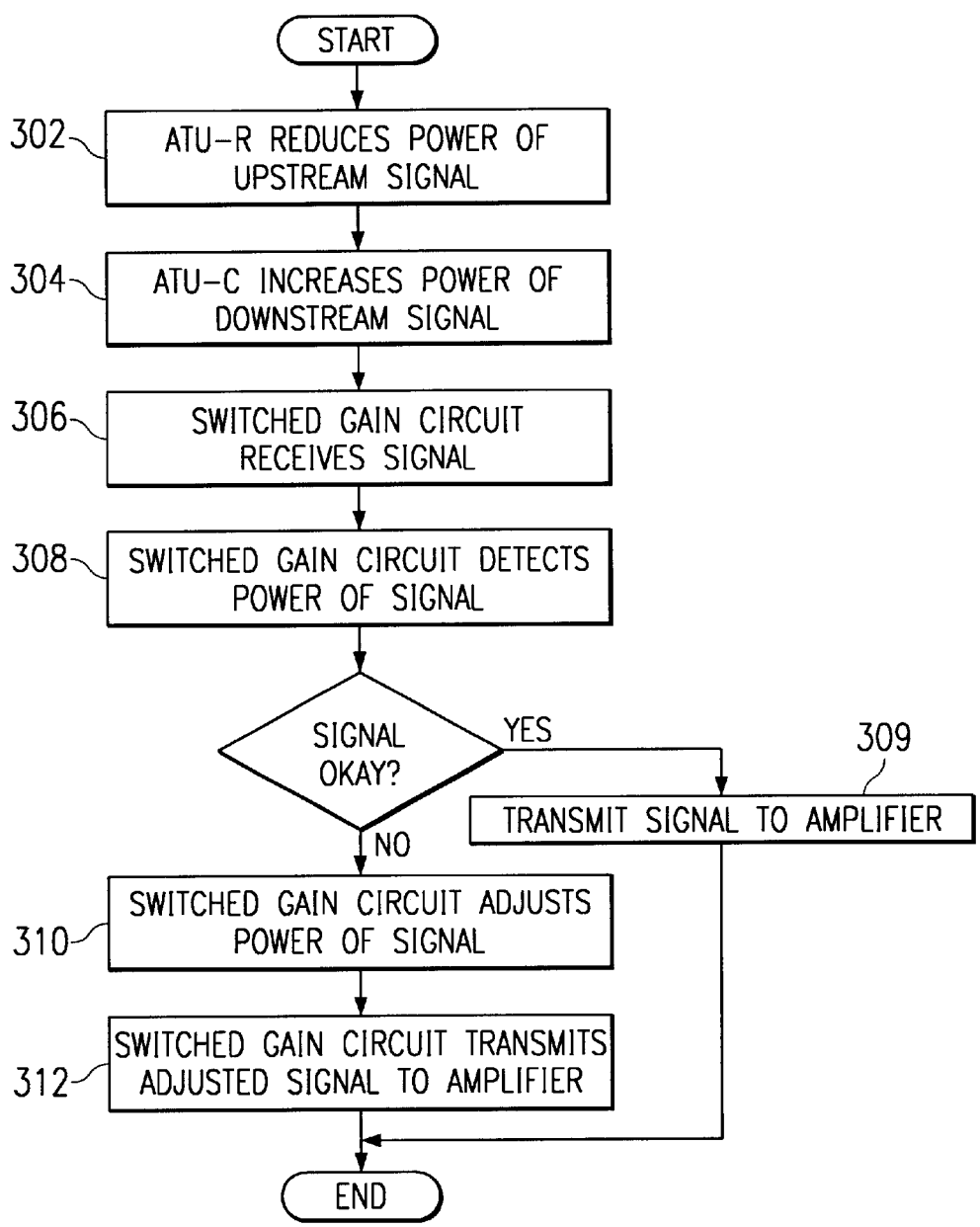
FIG. 3 is a flowchart demonstrating an embodiment of one method of data communication that may be used in accordance with the present invention.

An embodiment of the present invention and its advantages are best understood by referring to FIGS. 1 to 3 of the drawings, like numerals being used for like and corresponding parts of the various drawings.

FIG. 1 is a block diagram of one embodiment of a data communication system 100 that may be used in accordance with the present invention. System 100 comprises a first transceiver unit 102 operable to send signals to and receive signals from a second transceiver unit 104. First transceiver unit 102 may comprise, for example, an asymmetric digital subscriber line (ADSL) transceiver unit. ADSL transceiver unit (ATU) 102 may be located at a central office 106, which provides basic switching services for a communications system. Second transceiver unit 104 may comprise, for example, a remote ATU (ATU-R) 104 located at a customer's premises 108. ATU-R 104 may comprise, for example, a modem.

The central office ATU (ATU-C) 102 may be part of a digital subscriber line (DSL) interface device at the central office and may be integrated into a DSL access multiplexer (DSLAM) 110. ATU-C 102 may be coupled to a communication path 112. Communication path 112 may comprise, for example, a subscriber loop comprising a twisted pair, which is a pair of individually insulated electrically-conductive wires twisted together. Other suitable embodiments of communication paths 112 include coaxial cables, fiber optic cables, and radio waves, and combinations of these and other connection technologies. Downstream communication travels from central office 106 to customer's premises 108. Conversely, upstream communication travels from customer's premises 108 to central office 106. Communication path 112 may be coupled to a telephone 120 and to ATU-R 104. ATU-R 104 may be coupled to a premises distribution network 116, which may be, in turn, coupled to terminal equipment 118.

According to one embodiment of the present invention, in general, ATU-C 102 and ATU-R 104 may communicate with each other in the following manner. ATU-R 104 may reduce the power of the upstream signal by, for example, 9 dB in order to reduce the peak amplitudes of the upstream signal below that of the nonlinear region of the off-hook telephone circuitry. When ATU-C 102 receives the signal with the reduced power, ATU-C 102 estimates that ATU-R 104 is at a greater distance from ATU-C 102 than it actually is. In response, ATU-C 102 increases the power of the downstream signal. If ATU-R 104 is far enough away such that the power of the received signal is within the operational range of the high gain receiver amplifier, then no problems will result. If ATU-R 104 is too close, then ATU-R 104 of system 100 reduces the power of the signal so that the signal will not saturate the internal components, thus avoiding connection failure and poor performance.

FIG. 2 is one embodiment of a system 200 for adjusting the power of a signal that may be used in accordance with the present invention. System 200 comprises ATU-R 104 and telephone 120 coupled to central office 106 by communication path 112. ATU-R 104 comprises a hybrid circuit 220 coupled to communication path 112, a switched gain circuit 204 and a transmitter circuit 208 coupled to hybrid circuit 220, and a receiver circuit, for example, an amplifier 206, coupled to switched gain circuit 204.

Hybrid circuit 220 may comprise, for example, a 2-to-4 wire conversion circuit, and operates to couple communication path 112 to transmitter circuit 208 and receiver circuit 204. Amplifier 206 may comprise, for example, a receiver high gain amplifier. Switched gain circuit 204 may comprise, for example, a first relay 212 with a first resistor 213 and a second relay 214 with a second resistor 215. Switched gain circuit 204 operates to protect amplifier 206 from excess power received from the ATU-C 102. Switched gain circuit 204 detects the power of the downstream signal. If the power is too high, switched gain circuit 204 operates in a low gain position, where first relay 212 and second relay 214 open to decrease the power of the signal travelling to amplifier 206. If the power is acceptable, switch gain circuit operates in a high gain position, where first 212 and second 214 relays are closed to allow the full power of the signal to reach amplifier 206.

FIG. 3 is a flow chart demonstrating an embodiment of one method of data communication that may be used in accordance with the present invention. In general, the method operates to reduce the power of a downstream signal to protect amplifier 206 of ATU-R 104.

Specifically, the method begins at step 302, where ATU-R 104 reduces the power of the upstream signal. ATU-R may reduce the power of the upstream signal by, for example, 9 dB in order to reduce the peak amplitude of the upstream signal below that of the non-linear region of the off-hook telephone circuitry. When ATU-C 102 receives the signal with the reduced power, ATU-C 102 calculates that ATU-R 104 is at a greater distance from ATU-C 102 than it actually is. In response, at step 304 ATU-C 102 increases the power of the downstream signal. At step 306, switched gain circuit 204 of ATU-R 104 receives the signal with the increased power.

At step 308, switched gain circuit 204 detects the power of the received signal. The power of the received signal may be detected during the initialization process between ATU-C 102 and ATU-R 104, and may be detected using a digital signal processor. Switched gain circuit 204 may detect the power from the C-TONE of the received signal. Even with the increased power of the downstream signal, the power of the received signal may be within an acceptable range. For example, ATU-R 104 may be far enough away such that the power of the received signal is within the operational range of receiver circuit, or amplifier 206. If the power is acceptable, switched gain circuit 204 may operate in a high gain position and close first 212 and second 214 relays to allow the signal to travel to amplifier 206 at step 309, and the method terminates. The power of the received signal, however, may be too high. If ATU-R 104 is too close to ATU-C 102, then the power of the increased downstream signal may be above the operational range of amplifier 206. If the power is not acceptable, at step 310 switched gain circuit 204 operates in a low gain position to decrease the power of the signal. Switched gain circuit 204 may decrease the power of the downstream signal by opening first 212 and second 214 relays. A digital signal processor may be used to detect the signal and to select the appropriate gain setting. At step 312, amplifier 206 receives the adjusted signal, and the method terminates.

A technical advantage of the present invention inheres in the fact that it protects the receiver amplifier of an ADSL transceiver unit during splitterless operation of the transceiver unit. This allows for power cutback of the upstream signal in order to avoid the nonlinear regions of the nonlinear components of a POTS device, thus reducing the nonlinear echo and the generated harmonics and improving signal quality. Another technical advantage of the present invention is that it allows for splitterless operation of ADSL transceiver units. Splitterless operation of a remote ADSL transceiver unit allows a customer to plug the transceiver unit as well as a telephone into any phone jack on the customer's premises, without requiring professional installation and re-wiring of the telephone lines inside of the premises. These technical advantages provide residential users with a much-needed solution to the shortage of remote access bandwidth, while taking advantage of the enormous installed base of copper twisted-paired telephone wire that exists between central offices and local residential customers.

Although an embodiment of the invention and its advantages are described in detail, a person skilled in the art could make various alternations, additions, and omissions without departing from the spirit and scope of the present invention as defined by the appended claims.

What is claimed is:

1. A system for data communication, the system comprising:
  a hybrid circuit operable to receive a signal;
  a switched gain circuit coupled to the hybrid circuit and operable to receive the signal from the hybrid circuit, wherein the switched gain circuit is operable to detect the power of the signal received from the hybrid circuit using a C-TONE and adjust the power of the signal transmitted to the receiver circuit based upon the power of the signal received from the hybrid circuit; and
  a receiver circuit coupled to the switched gain circuit and operable to receive the signal from the switched gain circuit, wherein the switched gain circuit is operable to adjust the power of the signal transmitted to the receiver circuit.

2. The system of claim 1, wherein the switched gain circuit further comprises a relay operable to adjust the power of the signal transmitted to the receiver circuit based upon the power of the signal received from the hybrid circuit.

3. The system of claim 1, wherein the switched gain circuit further comprises a relay operable to adjust the power of the signal transmitted to the receiver circuit based upon the power of the signal received from the hybrid circuit, wherein the relay comprises a resistor.

4. The system of claim 1, wherein the switched gain circuit further comprises a first and a second relay, wherein the first and second relays are operable to adjust the power of the signal transmitted to the receiver circuit based upon the power of the signal received from the hybrid circuit.

5. The system of claim 1, wherein the switched gain circuit further comprises a first relay and a second relay, wherein:
  the first relay comprises a first resistor and the second relay comprises a second resistor; and
  the first and second relays are operable to adjust the power of the signal transmitted to the receiver circuit based upon the power of the signal received from the hybrid circuit.

6. The system of claim 1, wherein the switched gain circuit has a high gain position and a low gain position, and the switched gain circuit is operable to adjust the power of the signal transmitted to the receiver circuit based upon the power of the signal received from the hybrid circuit.

7. The system of claim 1, wherein the switched gain circuit has a high gain position and a low gain position, and the switched gain circuit is operable to attenuate the power of the signal transmitted to the receiver circuit based upon the power of the signal received from the hybrid circuit.

8. The system of claim 1, further comprising a digital signal processor operable to detect the power of the signal and to control the switched gain circuit.

9. A method for data communication, the method comprising:
  receiving a signal using a hybrid circuit;
  detecting the power of the signal using a C-TONE;
  transmitting the signal to a switched gain circuit coupled to the hybrid circuit;
  adjusting the power of the signal using the switched gain circuit based upon the power of the signal received from the hybrid circuit; and
  transmitting the adjusted signal to a receiver circuit coupled to the switched gain circuit.

10. The method of claim 9, wherein the switched gain circuit further comprises a relay operable to adjust the power of the signal transmitted to the receiver circuit based upon the power of the signal received from the hybrid circuit.

11. The method of claim 9, wherein the switched gain circuit further comprises a relay operable to adjust the power of the signal transmitted to the receiver circuit based upon the power of the signal received from the hybrid circuit, wherein the relay comprises a resistor.

12. The method of claim 9, wherein the switched gain circuit further comprises a first and a second relay, wherein the first and second relays are operable to adjust the power of the signal transmitted to the receiver circuit based upon the power of the signal received from the hybrid circuit.

13. The method of claim 9, wherein the switched gain circuit has a high gain position and a low gain position, and the switched gain circuit is operable to adjust the power of the signal transmitted to the receiver circuit by switching from the high gain position to the low gain position.

14. The method of claim 9, wherein the switched gain circuit has a high gain position and a low gain position, and the switched gain circuit is operable to adjust the power of the signal transmitted to the receiver circuit by switching from the low gain position to the high gain position.

15. The method of claim 9, wherein the step of adjusting comprises using a digital signal processor to detect and to adjust the power of the signal.

16. A method for data communication, the method comprising:

receiving a signal using a hybrid circuit;

detecting the power of the signal during an initialization sequence;

transmitting the signal to a switched gain circuit coupled to the hybrid circuit;

adjusting the power of the signal based upon the power of the signal using the switched gain circuit, wherein:

the switched gain circuit comprises a first relay and a second relay, the first relay comprising a first resistor and the second relay comprises a second resistor, and the first and second relays are operable to adjust the power of the signal transmitted to the receiver circuit based upon the power of the signal received from the hybrid circuit; and transmitting the adjusted signal to a receiver circuit coupled to the switched gain circuit.

* * * * *